M. C. JOHNSON.
FRICTION CLUTCH.
APPLICATION FILED FEB. 25, 1913.
1,079,348.
Patented Nov. 25, 1913.
2 SHEETS—SHEET 1.
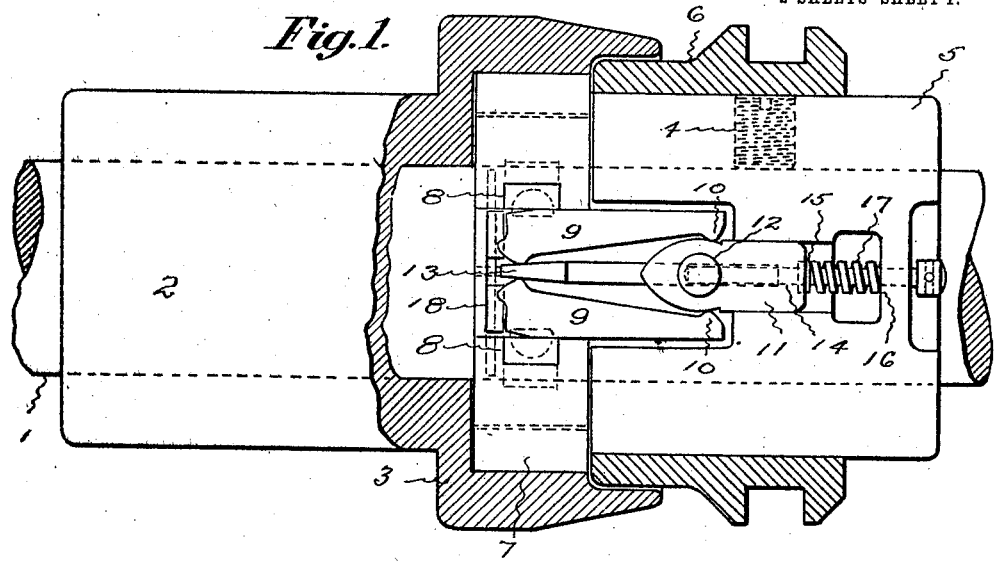
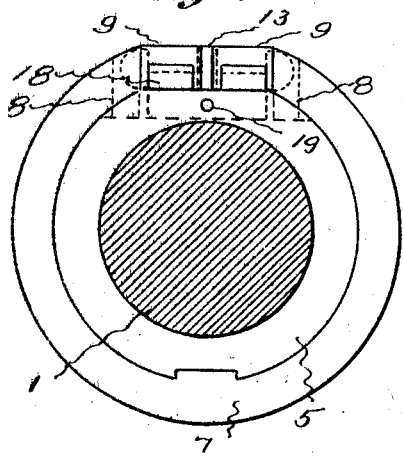
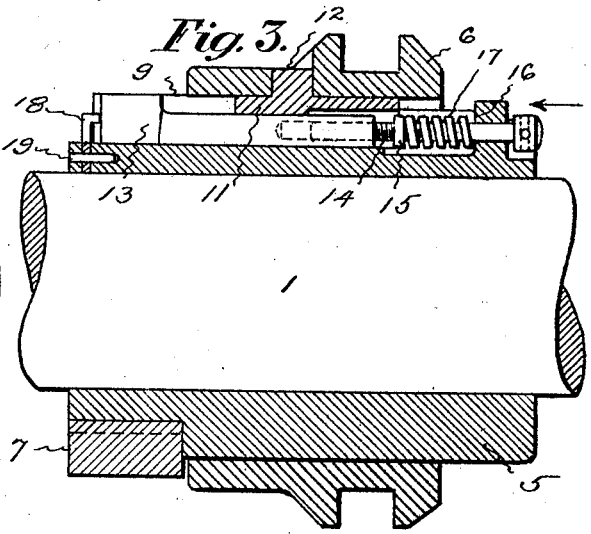
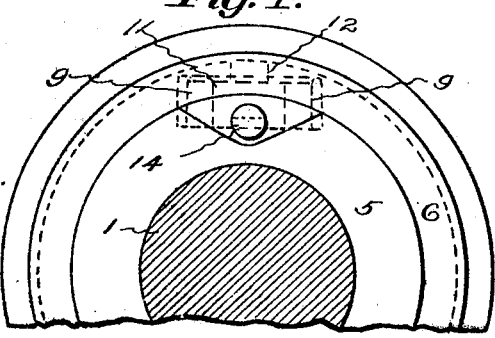
Witnesses:
F. H. Elliott
Josephine M. Strempfer
Inventor:
M. C. Johnson.
By his Attorney
Harry P. Williams M. C. JOHNSON.
FRICTION CLUTCH.
APPLICATION FILED FEB. 25, 1913.
1,079,348.
Patented Nov. 25, 1913.
2 SHEETS—SHEET 2.
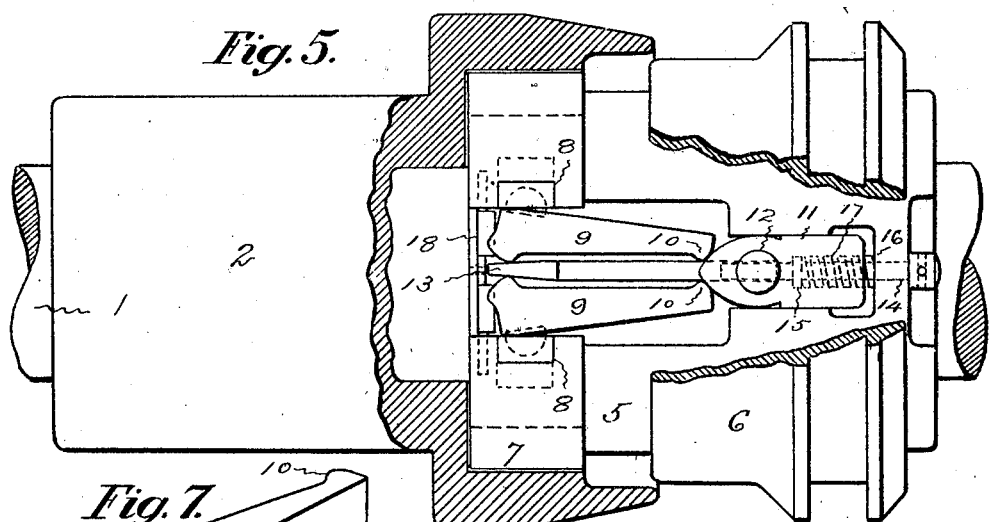
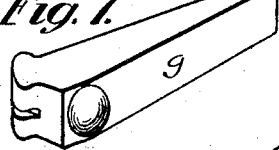
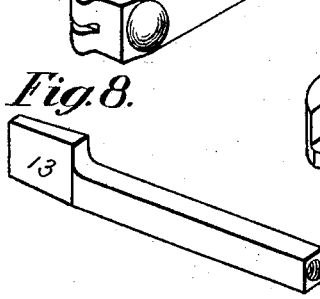
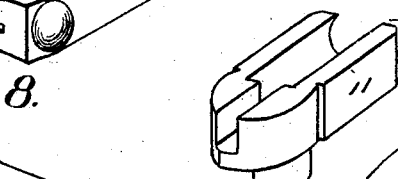
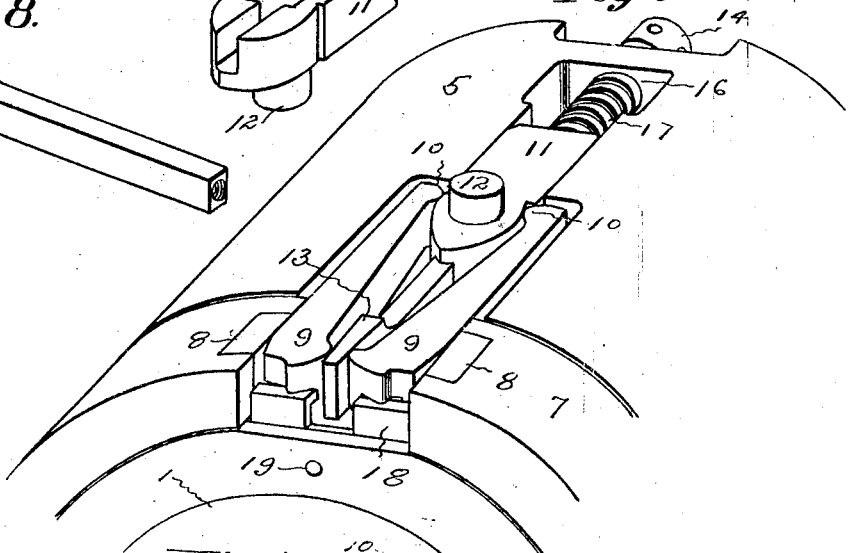
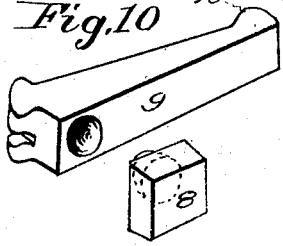
Witnesses:
F. H. Elliott
Josephine M. Strempfer
Inventor:
M. C. Johnson.
By his Attorney,
Harry R. Williams

UNITED STATES PATENT OFFICE.

MOSES C. JOHNSON, OF HARTFORD, CONNECTICUT.

FRICTION-CLUTCH.

1,079,348.  Specification of Letters Patent.  Patented Nov. 25, 1913.

Application filed February 25, 1913. Serial No. 750,703.

*To all whom it may concern:*

Be it known that I, MOSES C. JOHNSON, a citizen of the United States, residing at Hartford, in the county of Hartford and State of Connecticut, have invented a new and useful Improvement in Friction-Clutches, of which the following is a specification.

This invention relates to a friction clutch of the expansible ring type for connecting two shafts or for connecting a pulley, gear, or other rotating part with a shaft.

The object of the invention is to provide a very simple, compact, easily operated yet powerful clutch of this character, which has but few movable parts and which parts can be easily adjusted by a single screw for obtaining the right initial tension and to compensate for wear, the adjusting means being so arranged that while there is no protruding part, it can be readily reached and easily manipulated by hand or tool at any time whether the clutch is on a shaft in a light or dark place, or in a convenient or inconvenient location.

In this clutch the ring is expanded by wedge operated levers. These levers are of the nature of toggle levers and to attain the desired end the levers are fulcrumed on a tapering bar that is arranged so that it may be adjusted longitudinally between them from one end of the clutch in order to increase or decrease the distance between the fulcrum points of the levers whereby they may be made to expand the ring to just the necessary degree to insure the requisite engagement between the parts to obtain instantaneous and reliable action.

Figure 1 of the accompanying drawings shows a plan of the clutch with the cup and sleeve cut in central section and with the ring expanded. Fig. 2 shows an end view of the body, the expansible ring and the levers for expanding the ring. Fig. 3 shows a central section of the body and sleeve. Fig. 4 shows a view looking at the end of the body in the direction of the arrow on Fig. 3. Fig. 5 shows a plan with parts broken away and with the wedge withdrawn from between the levers and the ring contracted. Fig. 6 shows a perspective view of the body, the wedge, the levers, the adjustable sliding fulcrum bar and the ends of the expansible ring. Fig. 7 is a perspective view of one of the levers showing the ball-like bearing on the back edge of the lever that sets in the correspondingly shaped socket in the bearing block that is inserted in the end of the expansion ring. Fig. 8 shows a perspective view of the adjustable sliding fulcrum bar that is used between the levers. Fig. 9 is a perspective view of the lever operating wedge looking toward the bottom and showing the groove through which the sliding fulcrum bar passes. Fig. 10 shows a perspective view of a modified form of lever and bearing block.

The main or counter shaft 1 may be any size and may be used for any purpose. Fitting loosely on the shaft is a hub 2 which is shaped to receive a pulley, cone, gear, pinion, sprocket, eccentric, cam, or other rotating part of any desired diameter and face. Attached to or formed integral with the hub 2 is the cup-shaped female part 3 of the clutch. Adjacent to the cup and fastened to the shaft in any desired manner as by a set screw 4 is the clutch body 5. Sliding on the body of the clutch is a sleeve 6. This sleeve may be grooved as shown, or constructed in any other desired manner, so that it may be moved back and forth by any suitable shipper. Loosely held on the inner end of the body is the split ring 7 of spring metal. In recesses in the ends of the ring are bearing blocks 8. These bearing blocks extend down into the body and while holding the ring from movement off from the end of the body, do not restrict the expansion and contraction of the ring. In the opposing faces of these blocks are concave or ball-like sockets. The ring expanding levers 9 lie loosely in a recess in the body. On the backs of these levers are convex or ball like projections, the projections on the levers and the sockets in the blocks forming a ball and socket or universal joint between these parts. This may be reversed, as shown in Fig. 10, by making the sockets in the backs of the levers and the projections on the faces of the bearing blocks. The long arm of each lever is provided with a rounded bearing surface 10. Movable longitudinally in a recess in the body between the long arms of these levers is the wedge block 11. This wedge block has a stud 12 that projects outwardly into a correspondingly shaped opening in the sleeve 6 so that the movement inward of the sleeve causes the long arms of the levers to spread and the ring to be expanded, while drawing back the sleeve withdraws the wedge and allows the long arms of the levers to close and the ring to contract.

The levers fulcrum approximately opposite the convex surfaces which engage the blocks in the ends of the ring, on the opposite surfaces of a wedge shaped bar 13. The fulcrum bar upon which the levers fulcrum has a shank with a threaded socket, turning in which is a screw 14. The shank of the fulcrum bar and the inner end of the screw extend into a slot in the underside of the wedge. The screw extends to the end of the body and its head lies in a recess in such position that it can be readily reached by anyone and by the application of a suitable implement, such as the handle of a file, a piece of wire, or a nail, or by the fingers, may be turned so as to properly locate the fulcrum bar between the levers and thus adjust the fulcrum to obtain the proper expansion of the split ring to cause it to bind with the greatest efficiency against the inner surface of the female part or cup of the clutch. On the threaded part of the screw that is turned into the end of the fulcrum bar is a nut 15 and thrusting between this nut and the wall 16 of the body is a spring 17. This spring thrusting in this manner tends to force the sliding wedge-shaped fulcrum bar inward, but allows the bar to move outward when the levers are spread for expanding the ring, so that the distance from each other of the fulcrum points of the levers remains the same during action.

To compensate for wear and to cause the ring to expand with sufficient tightness against the inner surface of the female part of the clutch, the screw is turned and the fulcrum bar moved farther inward. This of course increases the distance between the fulcrum points of the levers. This tapered fulcrum bar has utility in that the action of the levers can be adjusted regardless of inaccuracies of workmanship, that is, the parts do not have to be made absolutely accurate, for this bar can be readily adjusted to compensate for all variations of manufacture as well as for wear.

In order to prevent the wedges from dropping out, any suitable means, which while not restricting their movements will retain them in place, may be arranged to engage their ends. The form shown for this purpose consists of a plate 18 which is dropped into a transverse slot in the front end of the body and is held therein by a pin 19. The outer edge of the plate shown is shaped so as to project into openings in the ends of the levers.

When the sleeve is moved inward the wedge which it carries engages and spreads the long arms of the levers and causes them to expand the ring against the inner surface of the female part of the clutch. When the sleeve is moved outward the wedge is withdrawn and the resilience of the ring causes it to contract. In order to obtain the proper adjustment when the device is built, or if it should become worn after use, the screw in the end of the fulcrum bar is turned so that a thicker portion of the wedge shaped end of the fulcrum bar will be between the short arms of the lever. As the levers are spread for expanding the ring, the short arms do not turn on the surfaces of the fulcrum bar, but the fulcrum bar yields, the spring permitting this. In other words, in ordinary use the distance between the fulcrum points of the levers is always the same but this distance may be varied, as mentioned, by turning the screw and adjusting the tapering fulcrum bar. As the bearings on the edges of the levers, and the sockets in the bearing blocks, are ball-like, there is practically a universal joint between these parts. When the ring is expanded the planes of the ends of the ring vary. For instance, if the planes of the ends of the ring are parallel when the ring is contracted, when the ring is expanded those planes will diverge.

If it was not for the universal movement that is possible between the levers and the ends of the ring, the levers would be obliged to tip or turn as the ring opened, which, unless they were properly formed and there was plenty of clearance, would cause a cramping of the parts. With the ball and socket arrangement, however, the bearing surfaces vary according to the conditions so that the levers will always lie in the same plane. This eliminates much friction and allows the parts to move easily. As a result of this elimination of friction, the fulcrum points of the levers may when the ring is expanded be brought more nearly into a straight line and thus greater power obtained without danger of locking the levers so that they will not readily release. Furthermore, the tension of the spring always forces the fulcrum bar forward and assists in turning the levers back to their normal position when the ring contracts. With this construction also the levers are reversible and interchangeable.

This clutch is very easy to adjust so that a very powerful grip between the parts can be obtained. The adjusting screw is in position where it can be readily seen and reached although it is protected by being embedded in a recess in the body so as to eliminate all danger of its catching anything when the parts are rotating.

This construction enables a very powerful clutch to be produced which will have the requisite strength with less material, and consequently less weight, than is possible where it is necessary to make holes or openings through the cup or female part of the clutch to reach an adjusting screw. Consequently, with a minimum weight this clutch will be capable of carrying a maximum load.

If wear occurs as a result of any incident of manufacture or of inferior material between the short arms of the levers and the fulcrum bar, the bar automatically adjusts itself under the pressure of the spring. The device is practically automatically adjustable after it has once been set up, because should there be a slight wear of the surfaces of the fulcrum bar, there will be a relative amount of wear at the head of the screw, that is, the wear of the parts will compensate each other and the spring will always hold the fulcrum bar up to proper place between the levers.

The invention claimed is:

1. A friction clutch having a female part and a male part with an expansible ring arranged between the two parts and turning with one of them, levers arranged to expand the ring, means for spreading the levers, and a yielding tapering fulcrum for the levers which is movable longitudinally of the levers.

2. A friction clutch having male and female parts with a split ring between the parts, levers for expanding the ring, means for spreading the levers and causing the ring to expand, a longitudinally movable fulcrum bar between the short arms of the levers, and a spring thrusting the fulcrum bar between the levers.

3. A friction clutch having male and female parts with a split ring between the parts, levers for expanding the ring, means for spreading the levers and causing the ring to expand, a tapering fulcrum bar projecting between the short arms of the levers, an adjustable screw threaded shank for the said bar, and a spring thrusting the bar between the levers.

4. A friction clutch having male and female parts with a split ring between said parts, levers for expanding the ring, ball-like bearing surfaces between the levers and the ends of the ring, and means for spreading the levers and causing the ring to expand.

5. A friction clutch having male and female parts with a split ring between said parts, levers for expanding the ring, spherical projections on the levers, spherical sockets in the ends of the ring for receiving said spherical projections, and means for spreading the levers and causing the ring to expand.

6. A friction clutch having a female part, a male part, an expansible ring between said parts, bearing blocks in the ends of said ring, levers for expanding the ring, spherical bearing surfaces between said blocks and said levers, and means for spreading the levers and causing the ring to expand.

7. A friction clutch having male and female parts with an expansible ring between said parts, blocks inserted in the ends of said rings, said blocks having spherical concavities, levers for expanding the ring, said levers having spherical projections occupying said concavities in the blocks, and means for spreading the levers and causing the ring to expand.

MOSES C. JOHNSON.

Witnesses:
JOSEPHINE M. STREMPFER,
HARRY R. WILLIAMS.